United States Patent
Barinov et al.

(10) Patent No.: US 11,140,269 B2
(45) Date of Patent: Oct. 5, 2021

(54) SYSTEMS AND METHODS FOR EXTENDED AGENT CAPACITY

(71) Applicant: Genesys Telecommunications Laboratories, Inc., Daly City, CA (US)

(72) Inventors: Vitaly Y. Barinov, Daly City, CA (US); Vitaliy Teryoshin, Daly City, CA (US); Yevgeniy Petrovykh, Daly City, CA (US); Arnaud Lejeune, Daly City, CA (US); Herbert Willi Artur Ristock, Daly City, CA (US)

(*) Notice: Subject to any disclaimer, the term of this patent is extended or adjusted under 35 U.S.C. 154(b) by 42 days.

(21) Appl. No.: 16/805,449

(22) Filed: Feb. 28, 2020

(65) Prior Publication Data

US 2020/0280635 A1    Sep. 3, 2020

Related U.S. Application Data

(60) Provisional application No. 62/812,269, filed on Mar. 1, 2019.

(51) Int. Cl.
| | |
|---|---|
| *H04M 3/00* | (2006.01) |
| *H04M 3/523* | (2006.01) |
| *H04M 3/56* | (2006.01) |
| *H04M 3/493* | (2006.01) |
| *H04M 3/51* | (2006.01) |

(52) U.S. Cl.
CPC ....... *H04M 3/5233* (2013.01); *H04M 3/4933* (2013.01); *H04M 3/5191* (2013.01); *H04M 3/5237* (2013.01); *H04M 3/567* (2013.01)

(58) Field of Classification Search
CPC .. H04M 3/567; H04M 3/5233; H04M 3/4933; H04M 3/5191; H04M 3/5237
See application file for complete search history.

(56) References Cited

U.S. PATENT DOCUMENTS

| | | | |
|---|---|---|---|
| 7,418,094 B2 | 8/2008 | Golitsin et al. | |
| 2015/0120757 A1* | 4/2015 | Gillespie | G06F 16/24578 707/748 |

\* cited by examiner

*Primary Examiner* — Rasha S Al Aubaidi

(57) ABSTRACT

A method for routing interactions arriving at a contact center. The method may include: providing a cost schedule for the interactions that includes a classifier in which categories of interaction types are defined and a cost value corresponding to each of the interaction types; providing a capacity value for agents; and routing the interactions in accordance with a routing process. The routing process may include: receiving the first interaction; pursuant to the classifier, classifying the first interaction as being a first interaction type; determining the cost value of the first interaction as being the cost value corresponding to the first interaction type in the cost schedule; calculating for each of the agents an available capacity; and routing the first interaction to a first agent based on the available capacity of the first agent being sufficient given the cost value.

20 Claims, 4 Drawing Sheets

SYSTEMS AND METHODS FOR EXTENDED AGENT CAPACITY

BACKGROUND OF THE INVENTION

The present invention is in the field of multimedia communications and interaction routing software and pertains particularly to methods and apparatus for routing multimedia events to contact center agents based on budget-based routing and agent capacity.

Telephones are one of the most widely used communication tools in the world. At first, telephones were merely a convenient tool to allow people to communicate at a distance. More recently, however, many companies use telephones to market products and services, provide technical support to customers, allow customers to access their own financial data, and so forth. To more effectively use telephones for business and marketing purposes, call centers were developed in which a relatively large number of representatives or agents handle telephone communication with clients or customers. The matching of calls between customers and agents is typically performed by software. For example, the software may in logic that routes incoming calls to agents who can best handle the calls based on predefined criteria (e.g., language skill, knowledge of products the customer bought, etc.). The software also can transfer relevant information about the customer to a computer screen used by the agent. Thus, the agent can be given valuable information about the customer prior to receiving the call and as the call progresses. As a result, the agent can more effectively handle the interaction.

It can be seen from the above example that the enabling technology requires a combination of telephone switching and computer information processing technologies. The term commonly used in the art for this combined technology is computer-telephony-integration (CTI). In recent years, advances in computer technology, telephony equipment, and infrastructure have provided many opportunities for improving telephone service. Similarly, development of the information and data network known as Internet, together with advances in computer hardware and software have led to a new multimedia telephone system which will be referred to herein as data-network-telephony (DNT) which encompasses all multimedia-based communication including Internet Protocol Network Telephony (IPNT). IPNT is a special case of Data Network Telephony (DNT) wherein telephone calls are computer-simulated, and audio data is transmitted in the form of data packets. In DNT systems as well as in the older intelligent and CTI-enhanced telephony systems, both privately and publicly-switched, it is desirable to handle more calls faster and to provide improved service in every way. This desire applies to multimedia-based communications in addition to telephone calls, as some call centers have moved to combine DNT with CTI technologies. It is emphasized that computer-simulated calls attributed to DNT may be made over company Intranets and other sorts of data networks as well as the Internet. The Internet is primarily used an as an example in this specification because it is broad and pervasive with universal protocol.

As multimedia capabilities expanded, the term "call center" has largely given way to "contact center", as customers may now interact with agents via a variety of communications channels, including email, text, video conferencing, screen sharing, etc. Still, a major goal of any contact center is to maximize customer satisfaction. Part of the satisfaction relates to how quickly and efficiently he or she is served. For example, when a customer calls in to place an order for a product or service, he or she does not want to be put on hold for a lengthy period of time. Or, if a customer sends an E-mail, voicemail, text, or other type of multimedia communication, he or she does not want to be overlooked. Rather, the customer desires that a timely and professional response will be sent back by the company. This is especially true with company-to-company buying of products or services. A typical buyer has many duties that can be interrupted because of inordinate amounts of time spent waiting to place an order. In these types of situations, idle time costs money, and in many cases, cannot be tolerated. Many orders are lost by companies who have put customers in long waiting queues or subjected them to long waiting periods for multimedia responses. Such customers often become annoyed, perhaps searching for a suitable competitor who can meet their needs in a timely manner. Thus, with contact centers evolving into sophisticated and fast-paced multimedia communication systems, it becomes necessary to develop capabilities for prioritizing and intelligently routing all forms of communication with the goal of expedient and professional service to the customer in mind.

Intelligent routing rules put in place in some intelligent networks have provided some relief for callers who would otherwise be stuck in queue much longer without them. For example, in some intelligent networks known to the inventor, skill-based routing, predictive routing, routing based on agent availability, as well as other intelligent implementations have provided for a better use of agent time within a call-center environment, thereby shortening queue length and reducing waiting time. However, even with these developments, there are certain peak periods during call-center operation that long waiting queues are unavoidable. Also, intelligent routing rules, such as predictive routing or routing based on skill set of the agent, are somewhat limited in current art to conventional telephone apparatus and calls. Skill-based intelligent routing as used in communication-center routing schemes has long been associated on a per-media basis and connected to more basic routing intelligence such as routing based on real-time availability or even predicted availability. In other words, when a customer calls in, first an available agent is found that meets a certain pre-set skill value in terms of possessing a certain type of specialized skill required of the caller. For example, if a Spanish-speaking customer is looking for assistance, the agent selected would have to possess the basic skills required to service the interests of the caller and the particular skill of speaking Spanish. Skills then are largely pre-set values that are quantified and qualified for agents before creating intelligent routing routines that utilize the values in routing. Skill predeterminations for agents working in a communications center environment are limited to real-value skills like the ability to speak Spanish, the ability to process certain documents, knowledge in certain areas of business function, access to certain external data sources, and so on.

Availability routing routines are based on the availability of an agent in real-time and can be discerned in real-time during execution of an intelligent routine. The inventor knows of predictive agent-availability routines that can predict a probability factor of whether or not a particular agent or group of agents will be available at a certain point in time. Predictive routines eliminate some of the steps required of real agent-availability routines and therefore streamline the routing process even if they are somewhat less reliable in producing an available agent for a caller waiting in queue. Agent availability routines, unlike traditional load-balancing routines, are particular to agents' media responsibilities as practiced at their stations for agent-level-routing (ALR). In a multimedia-capable contact center for example, any one agent may be responsible for several communications mediums like telephone, e-mail, voice mail, Internet telephony, Fax, file transfers, and so on. Unlike determining agent loads at switches, shared queues, and other major routing points, agent availability based on media is concerned with the ongoing local tasks of an agent who may be handling several communications mediums simultaneously at his or her station.

One way to determine agent availability for routing is to monitor the agent meticulously, such as by requiring the agent to log in and out of communications tasks and/or assigning specific tasks for specific periods. For example, when an agent is logged in answering e-mail, he or she is somewhat less available for answering other mediums of communications like telephone, or file transfers. Some agents may be determined to be unavailable for all other mediums if a telephony queue reaches a certain threshold. Therefore, it can be seen that modern agent-availability values are largely scalar in nature and based on current queue loads and real-time agent scheduling. Typically, from the caller's viewpoint, an agent is determined to be busy or not busy. Aside from strict management of what mediums an agent is allowed to work with at any given period, predicting the true availability of an agent across multiple mediums is not practiced.

Multimedia queue capabilities and event prioritization can be enhanced with local knowledge of agent interaction or communication systems status and communications-medium-based agent skill assessments and availability to produce an intelligent routing routine that incorporates both skills and availability factors across multiple mediums. Therefore, what is needed is a method of intelligent routing that computes real-time agent availability across multiple communications mediums wherein the computed value also accounts for agent up-to-date skill levels in handling the mediums encountered. Such a method would provide a predictive routine that would further streamline multimedia queues and result in faster event processing and customer satisfaction.

BRIEF DESCRIPTION OF THE INVENTION

The present application describes a processor-implemented method for routing interactions arriving at a contact center among agents. The method may include the steps of: providing a cost schedule for the interactions, wherein the cost schedule comprises a classifier in which categories of interaction types are defined and a cost value corresponding to each of the interaction types; providing a capacity value for each of the agents; and routing the interactions in accordance with a routing process. Described in relation to a first interaction, the routing process may include: receiving the first interaction; pursuant to the classifier, classifying the first interaction as being a first interaction type; determining the cost value of the first interaction as being the cost value corresponding to the first interaction type in the cost schedule; calculating for each of the agents an available capacity; and routing the first interaction to a first agent based, at least in part, on the available capacity of the first agent being sufficient given the cost value of the first interaction.

The present application further describes a system for routing interactions amount agents within a contact center. The system may include a hardware processor and a machine-readable storage medium on which is stored instructions that cause the hardware processor to execute a process. The process may include: providing a cost schedule for the interactions, wherein the cost schedule includes a classifier in which categories of interaction types are defined and a cost value corresponding to each of the interaction types; providing a capacity value for each of the agents; and routing the interactions in accordance with a routing process. Described in relation to a first interaction, the routing subprocess may include: receiving the first interaction; pursuant to the classifier, classifying the first interaction as being a first interaction type; determining the cost value of the first interaction as being the cost value corresponding to the first interaction type in the cost schedule; calculating for each of the agents an available capacity; and routing the first interaction to a first agent based, at least in part, on the available capacity of the first agent being sufficient given the cost value of the first interaction.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
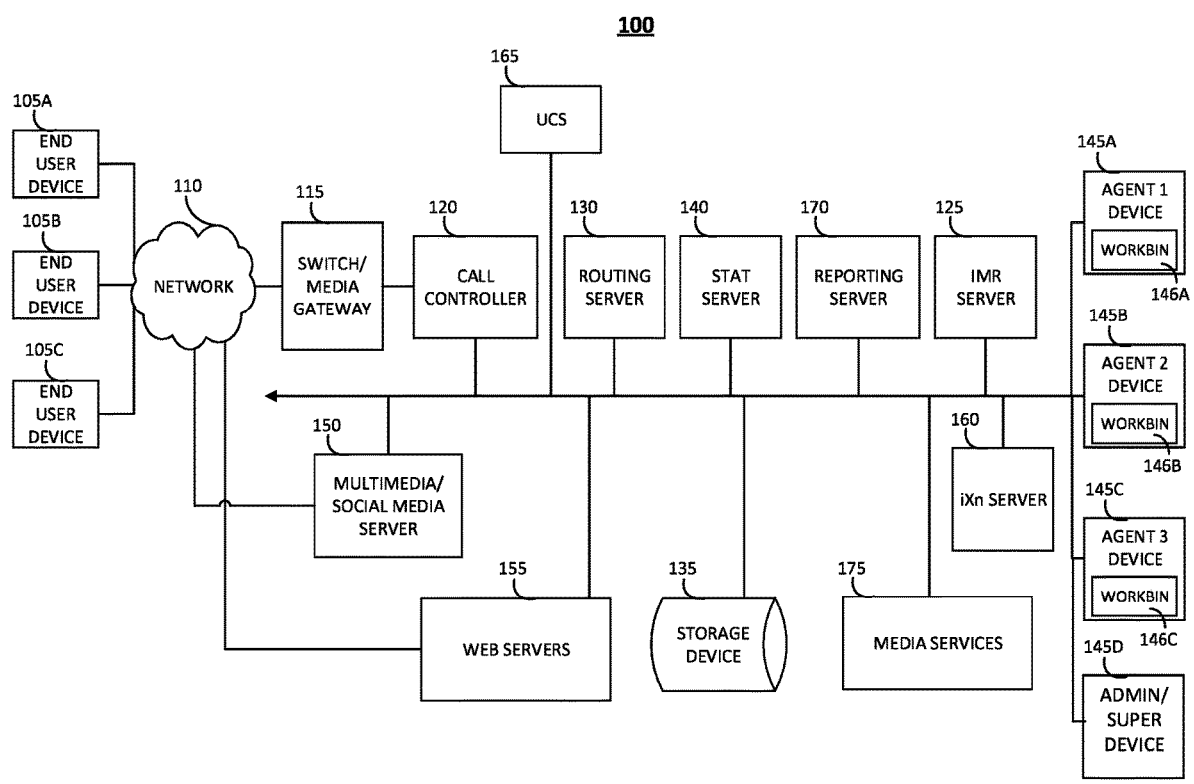
FIG. 1 illustrates a block diagram of a system for supporting a contact center in accordance with aspects of the present invention.

To promote an understanding of the invention of the present application (or "present invention"), reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials, components, or methods have not been described in detail in order to avoid obscuring the present invention. Additionally, further modification in the provided examples or application of the principles of the invention, as presented herein, are contemplated as would normally occur to those skilled in the art.

Additionally, as used herein, language designating non-limiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure or characteristic described in connection with the given example may be included in at least one embodiment of the present invention. Thus, appearances of the phrases "an embodiment", "one embodiment", "present embodiments", "exemplary embodiments", "certain embodiments" and the like are not necessarily all referring to the same embodiment or example. Further, particular features, structures or characteristics may be combined in any suitable combinations and/or sub-combinations in one or more embodiments or examples.

Embodiments of the present invention may be implemented as an apparatus, method, or computer program product. Accordingly, example embodiments may take the form of an entirely hardware embodiment, an entirely software embodiment (including firmware, resident software, micro-code, etc.), or an embodiment combining software and hardware aspects that may all generally be referred to herein as a "module" or "system." Further, example embodiments may take the form of a computer program product embodied in any tangible medium of expression having computer-usable program code embodied in the medium. In addition, it will be appreciated that the figures provided herewith are for explanation purposes to persons ordinarily skilled in the art and that the drawings are not necessarily drawn to scale. It will be further appreciated that the flowchart and block diagrams provided in the figures illustrate architecture, functionality, and operation of possible implementations of systems, methods, and computer program products according to example embodiments of the present invention. In this regard, each block in the flowchart or block diagrams may represent a module, segment, or portion of code, which includes one or more executable instructions for implementing the specified logical functions. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. Finally, the terms "interaction" and "communication" are used interchangeably, and generally refer to any real-time and non-real-time interaction that uses any communication channel including, without limitation, telephony calls (PSTN or VoIP calls), emails, vmails, video, chat, screen-sharing, text messages, social media messages, WebRTC calls, etc.

Agents in contact centers can be assigned a variety of tasks. While some of these tasks, such as phone calls, require much of an agent's attention span, other tasks (e.g., conducting a chat conversation, answering an email, etc.) can be performed simultaneously. In order to support such multi-tasking, an agent capacity model has been proposed, as described in U.S. Pat. No. 7,418,094, Issued Aug. 26, 2008, Title "Method and Apparatus for Multimedia Interaction Routing According to Agent Capacity Sets", the disclosure of which is incorporated herein by reference. This model allows defined rules for upper limits of various media types, e.g., no more than 5 concurrent chats or 4 concurrent. However, the model is limited regarding flexible adjustment to individual agent's capabilities and fine-tuning per the type and content of interactions.

The present invention introduces improvements to the agent capacity model, including the budgeting of a total capacity of an agent (or "agent capacity") using predetermined costs (or "cost values") associated with different types of interaction. Thus, instead of simply focusing on the number of interactions, the capacity of an agent—i.e., the upper limit of interactions that an agent can effectively handle at any given time—can be more accurately expressed by summing the cost values of the interactions the agent is handling. In certain embodiments, budgeting rules are included that prevent the total interaction costs, which is the sum of cost values for the interactions being handled by an agent at any one time, from exceeding an agent's capacity for a particular agent. As will be seen, certain embodiments may include an overdraft buffer for exceeding such limits under some circumstances. In other embodiments, interaction cost values and agent capacity values can be flexibly tuned during runtime to reflect actual performance. For example, machine learning can be applied to optimize those values and proactively satisfy changing traffic patterns. Further, the agent budgeting models of the present invention can be combined with the existing capacity models, e.g., using the latter for controlling absolute number of assigned interactions.

Contact Center Systems

FIG. 1 is a diagram illustrating an embodiment of a communication infrastructure, indicated generally at 100. For example, FIG. 1 illustrates a system for supporting a contact center in providing contact center services. The contact center may be an in-house facility to a business or enterprise for serving the enterprise in performing the functions of sales and service relative to the products and services available through the enterprise. In another aspect, the contact center may be operated by a third-party service provider. In example embodiments, the contact center may operate as a hybrid system in which some components of the contact center system are hosted at the contact center premises and other components are hosted remotely (e.g., in a cloud-based environment). The contact center may be deployed on equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

Components of the communication infrastructure indicated generally at 100 include: a plurality of end user devices 105A, 105B, 105C; a communications network 110; a switch/media gateway 115; a call controller 120; an IMR server 125; a routing server 130; a storage device 135; a stat server 140; a plurality of agent devices 145A, 145B, 145C including workbins 146A, 146B, 146C; an admin/supervisor device 145D; a multimedia/social media server 150; web servers 155; an interaction server 160; an universal contact server (or UCS) 165; a reporting server 170; and media services 175.

In example embodiments, the contact center system manages resources (e.g., personnel, computers, telecommunication equipment, etc.) to enable delivery of services via telephone or other communication mechanisms. Such services may vary depending on the type of contact center and may range from customer service to help desk, emergency response, telemarketing, order taking, etc.

Customers, potential customers, or other end users (collectively referred to as customers or end users) desiring to receive services from the contact center may initiate inbound communications (e.g., telephony calls, emails, chats, etc.) to the contact center via end user devices 105A, 105B, and 105C (collectively referenced as 105). Each of the end user devices 105 may be a communication device conventional in the art, such as a telephone, wireless phone, smart phone, personal computer, electronic tablet, laptop, etc., to name some non-limiting examples. Users operating the end user devices 105 may initiate, manage, and respond to telephone calls, emails, chats, text messages, web-browsing sessions, and other multi-media transactions. While three end user devices 105 are illustrated at 100 for simplicity, any number may be present.

Inbound and outbound communications from and to the end user devices 105 may traverse a network 110 depending on the type of device that is being used. The network 110 may include a communication network of telephone, cellular, and/or data services and may also include a private or public switched telephone network (PSTN), local area network (LAN), private wide area network (WAN), and/or public WAN such as the Internet, to name a non-limiting example. The network 110 may also include a wireless carrier network including a code division multiple access (CDMA) network, global system for mobile communications (GSM) network, or any wireless network/technology conventional in the art, including but not limited to 3G, 4G, LTE, 5G, etc.

In example embodiments, the contact center system includes a switch/media gateway 115 coupled to the network 110 for receiving and transmitting telephony calls between the end users and the contact center. The switch/media gateway 115 may include a telephony switch or communication switch configured to function as a central switch for agent level routing within the center. The switch may be a hardware switching system or a soft switch implemented via software. For example, the switch 115 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

In example embodiments, the switch is coupled to a call controller 120 which may, for example, serve as an adapter or interface between the switch and the remainder of the routing, monitoring, and other communication-handling components of the contact center. The call controller 120 may be configured to process PSTN calls, VoIP calls, etc. For example, the call controller 120 may be configured with computer-telephony integration (CTI) software for interfacing with the switch/media gateway and contact center equipment. In example embodiments, the call controller 120 may include a session initiation protocol (SIP) server for processing SIP calls. The call controller 120 may also extract data about the customer interaction, such as the caller's telephone number (e.g., the automatic number identification (ANI) number), the customer's internet protocol (IP) address, or email address, and communicate with other components of the system 100 in processing the interaction.

In example embodiments, the system 100 further includes an interactive media response (IMR) server 125. The MIR server 125 may also be referred to as a self-help system, a virtual assistant, etc. The MIR server 125 may be similar to an interactive voice response (IVR) server, except that the IMR server 125 is not restricted to voice and additionally may cover a variety of media channels. In an example illustrating voice, the MIR server 125 may be configured with an IMR script for querying customers on their needs. For example, a contact center for a bank may tell customers via the IMR script to "press 1" if they wish to retrieve their account balance. Through continued interaction with the MIR server 125, customers may be able to complete service without needing to speak with an agent. The IMR server 125 may also ask an open-ended question such as, "How can I help you?" and the customer may speak or otherwise enter a reason for contacting the contact center. The customer's response may be used by a routing server 130 to route the call or communication to an appropriate contact center resource.

If the communication is to be routed to an agent, the call controller 120 interacts with the routing server (also referred to as an orchestration server) 130 to find an appropriate agent for processing the interaction. The selection of an appropriate agent for routing an inbound interaction may be based, for example, on a routing strategy employed by the routing server 130, and further based on information about agent availability, skills, and other routing parameters provided, for example, by a statistics server 140, as will be described in more detail below.

In example embodiments, the routing server 130 may query a customer database, which stores information about existing customers, such as contact information, service level agreement (SLA) requirements, nature of previous customer contacts and actions taken by the contact center to resolve any customer issues, etc. The database may be, for example, Cassandra or any NoSQL database, and may be stored in a mass storage device 135. The database may also be a SQL database and may be managed by any database management system such as, for example, Oracle, IBM DB2, Microsoft SQL server, Microsoft Access, PostgreSQL, etc., to name a few non-limiting examples. The routing server 130 may query the customer information from the customer database via an ANI or any other information collected by the IMR server 125.

Once an appropriate agent is identified as being available to handle a communication, a connection may be made between the customer and an agent device 145A, 145B and/or 145C (collectively referenced as 145) of the identified agent. While three agent devices are illustrated in FIG. 1 for simplicity, any number of devices may be present. An administrator/supervisor device 145D may also be present. The administrator/supervisor device 145D may be controlled by an admin or supervisor in the contact center, who manages the agents. Additionally, the administrator or supervisor can configure settings within the contact center software platform from the device 145D. While only one is illustrated in FIG. 1 for simplicity, any number of administrator/supervisor devices 145D may be present within a contact center or enterprise setting. Collected information about the customer and/or the customer's historical information may also be provided to the agent device for aiding the agent in better servicing the communication and additionally to the contact center admin/supervisor device for managing the contact center. In this regard, each device 145 may include a telephone adapted for regular telephone calls, VoIP calls, etc. The device 145 may also include a computer for communicating with one or more servers of the contact center and performing data processing associated with contact center operations, and for interfacing with customers via voice and other multimedia communication mechanisms.

The contact center system 100 may also include a multimedia/social media server 150 for engaging in media interactions other than voice interactions with the end user devices 105 and/or web servers 155. The media interactions may be related, for example, to email, vmail (voice mail through email), chat, video, text-messaging, web, social media, co-browsing, etc. The multi-media/social media server 150 may take the form of any IP router conventional in the art with specialized hardware and software for receiving, processing, and forwarding multi-media events.

The web servers 155 may include, for example, social interaction site hosts for a variety of known social interaction sites to which an end user may subscribe, such as Facebook, Twitter, Instagram, etc., to name a few non-limiting examples. In example embodiments, although web servers 155 are depicted as part of the contact center system 100, the web servers may also be provided by third parties and/or maintained outside of the contact center premise. The web servers 155 may also provide web pages for the enterprise that is being supported by the contact center system 100. End users may browse the web pages and get information about the enterprise's products and services. The web pages may also provide a mechanism for contacting the contact center via, for example, web chat, voice call, email, web real-time communication (WebRTC), etc.

In example embodiments, deferrable interactions/activities may also be routed to the contact center agents in addition to real-time interactions. Deferrable interaction/activities may include back-office work or work that may be performed off-line such as responding to emails, letters, attending training, or other activities that do not entail real-time communication with a customer. The interaction server 160 interacts with the routing server 130 for selecting an appropriate agent to handle the activity. Once assigned to an agent, an activity may be pushed to the agent, or may appear in the agent's workbin 146A, 146B, 146C (collectively 146) as a task to be completed by the agent. The agent's workbin may be implemented via any data structure conventional in the art, such as, for example, a linked list, array, etc. A workbin 146 may be maintained, for example, in buffer memory of each agent device 145.

In example embodiments, the mass storage device(s) 135 may store one or more databases relating to agent data (e.g., agent profiles, schedules, etc.), customer data (e.g., customer profiles), interaction data (e.g., details of each interaction with a customer, including, but not limited to: reason for the interaction, disposition data, wait time, handle time, etc.), and the like. In another embodiment, some of the data (e.g., customer profile data) may be maintained in a customer relations management (CRM) database hosted in the mass storage device 135 or elsewhere. The mass storage device 135 may take form of a hard disk or disk array as is conventional in the art.

In example embodiments, the contact center system may include a universal contact server (UCS) 165, configured to retrieve information stored in the CRM database and direct information to be stored in the CRM database. The UCS 165 may also be configured to facilitate maintaining a history of customers' preferences and interaction history, and to capture and store data regarding comments from agents, customer communication history, etc.

The contact center system may also include a reporting server 170 configured to generate reports from data aggregated by the statistics server 140. Such reports may include near real-time reports or historical reports concerning the state of resources, such as, for example, average wait time, abandonment rate, agent occupancy, etc. The reports may be generated automatically or in response to specific requests from a requestor (e.g., agent/administrator, contact center application, etc.).

The various servers of FIG. 1 may each include one or more processors executing computer program instructions and interacting with other system components for performing the various functionalities described herein. The computer program instructions are stored in a memory implemented using a standard memory device, such as for example, a random-access memory (RAM). The computer program instructions may also be stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

The media services 175 may provide audio and/or video services to support contact center features such as prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, and keyword spotting.

In example embodiments, the premises-based platform product may provide access to and control of components of the system 100 through user interfaces (UIs) present on the agent devices 145A-C and on the Administrator/Supervisor Device 145D. Within the premises-based platform product, the graphical application generator program may be integrated which allows a user to write the programs (handlers) that control various interaction processing behaviors within the premises-based platform product.

As noted above, the contact center may operate as a hybrid system in which some or all components are hosted remotely, such as in a cloud-based environment. For the sake of convenience, aspects of embodiments of the present invention will be described below with respect to providing modular tools from a cloud-based environment to components housed on-premises.

Budget-Based Routing

The following embodiments may draw upon the functionality of one or more of the previously described components and servers of the contact center 100, including the stat server 140, routing server 130, the interaction server 160, and media server 150. In example embodiments, the routing server queries the stat server, which may maintain data associated with performance of the contact center in accordance with the types of data described herein. To begin work, agents may log in and, thereby, make themselves available to accept incoming interactions.

In accordance with the agent budgeting systems and methods of the present invention—which may also be referred to generally as an "agent budgeting model"—several types of data or settings may be defined and maintained for use in calculating agent availability for the routing of incoming interactions. First, the agent budgeting model may include a budget or capacity value (hereinafter "capacity value") for each of the agents. Specifically, each agent within a pool of agents available in any given work period may be defined by a capacity value, which represents a maximum value an agent is permitted to handle at any one time in terms of a total sum of cost values of active or ongoing concurrent interactions. The capacity values for the agents may be determined independently, for example, based on each agent's experience and past performance, or by using capacity vectors. Further, the capacity value may also be calculated per agent or group of agents, such as all agents located a particular location. For the sake of a simplified example, a capacity value of 100 will be assumed for each of the agents in the following example. As discussed more below, when an incoming interaction is routed to an agent and while that agent is handling it, the capacity value of the agent may be reflected by a "used capacity value" and an "available capacity value". The used capacity value reflects the portion being used to handle ongoing interactions, while the available capacity value reflects the ability of the agent to accept other interactions.

Second, the agent budgeting model may include interaction cost values (hereinafter "cost values") that define relative costs for the different classifications of interactions (or "interaction classifiers") that cost centers regularly handle. In accordance with preferred embodiments, one such interaction classifier is based on the type of media (telephone or voice, chat, text, email, video conferencing, screen sharing, etc.) being used in the interaction. Another such interaction classifier may include a predicted complexity or difficulty of the interaction. Other criteria may also be used as classifiers. Within each interaction classifier, a plurality of interaction types is defined to differentiate the interactions. Each of the interaction types is assigned a cost value such that a weighted cost schedule is created that reflects relative differences between the interaction types in terms of an agent's attention span expended to handle.

As an example, a cost schedule for an agent budgeting model may include an interaction classifier that groups interactions by media. In such a case, the interaction classifier may include interaction types corresponding to the different types of media by which interactions with customers are conducted. In a simplified example, the interaction types may include chat, email, and telephone. In example embodiments, a cost value may be assigned to each of these interaction types. The cost value of a chat interaction may be set at 20. The cost value of an email interaction may be set at 30. In example embodiments, the cost value of a telephone interaction may be set at 60. Such cost values, for example, may be presented as 1-byte integers [0 . . . 255], with the desired weights are mapped to appropriate integers, preserving their ratios.

Using these exemplary cost values along with an agent capacity value of 100, it will be appreciated that an agent could concurrently handle a several different mixtures of interaction types before exceeding a given capacity value of 100. As a first example, an agent would be allowed to concurrently handle one telephone interaction (cost value of 60) and one email interaction (cost value of 30). This is because the sum of those, which is 90, is less than the agent's capacity value of 100. That is, the budgeting model can keep routed interactions to an agent so long as the sum of the cost values of the interactions being handled by that agent does not exceed the agent's capacity.

As a second example, an agent could be handling two chat interactions (cost value of 20+20=40) and an email interaction (cost value of 30), and still be routed a third chat interaction because the agent's available capacity of 30—which is determined by subtracting his used capacity of 70 (i.e., 40+30) from his capacity value of 100—is larger than the chat interaction (cost value of 20). Assuming each of the other interactions remains ongoing, that addition of the third chat interaction will increase the agent's used capacity to 90 while decreasing the agent's available capacity to 10. With an available capacity of 10, it will be appreciated that the routing to the agent of an additional interaction will be prevented given that the hypothetical cost values used in the example. This is because none of the cost values are less than the agent's available capacity, meaning that the addition of any one of them would push the agent's used capacity past the agent's capacity value limit.

Within such a cost schedule, other differentiators may be used to further refine the cost values assigned to incoming interactions. For example, incoming interactions may be categorized by a complexity or difficulty, which may be predicted based on information available when the interaction arrives, such as, customer name or stated intent. Thus, certain types of interactions may be classified as having "low difficulty". Others may be classified as having "medium difficulty", while others may be classified as having "high difficulty". Each of these categories may be assigned a cost value, which then may be used alone or in conjunction with other cost values related to other types of categories, such as the above-described media categories. For example, the cost value for an interaction having low difficulty may be set at zero (0), the cost value for an interaction having medium difficulty may be set at five (5), and the cost value for an interaction having high difficulty may be set at ten (10). When used in conjunction with the cost values related to media type, each of the cost values applicable to the interaction may be summed to produce the cost value of the incoming interaction. Thus, using the cost examples provided above, the cost value of a "high difficulty chat interaction" is 30 (i.e., 20 for media type+10 for complexity). The cost value of a "medium difficulty email interaction" is 35 (i.e., 30 for media type+5 for medium complexity). And, the cost value of a "low difficulty voice interaction" is 60 (i.e., 60 for media type+0 for complexity).

The schedule of cost values (or "cost schedule") and agent capacity rules may be stored and retrieved during runtime as necessary. Dynamic changes during runtime are supported and become effective immediately. Such changes, however, may be applied only for future interactions and not retroactively (i.e., the capacity vector is not recalculated). Various options may be used for implementation, such as a custom media server, widgets, business strategy, agent desktop, etc.

Figure 2:
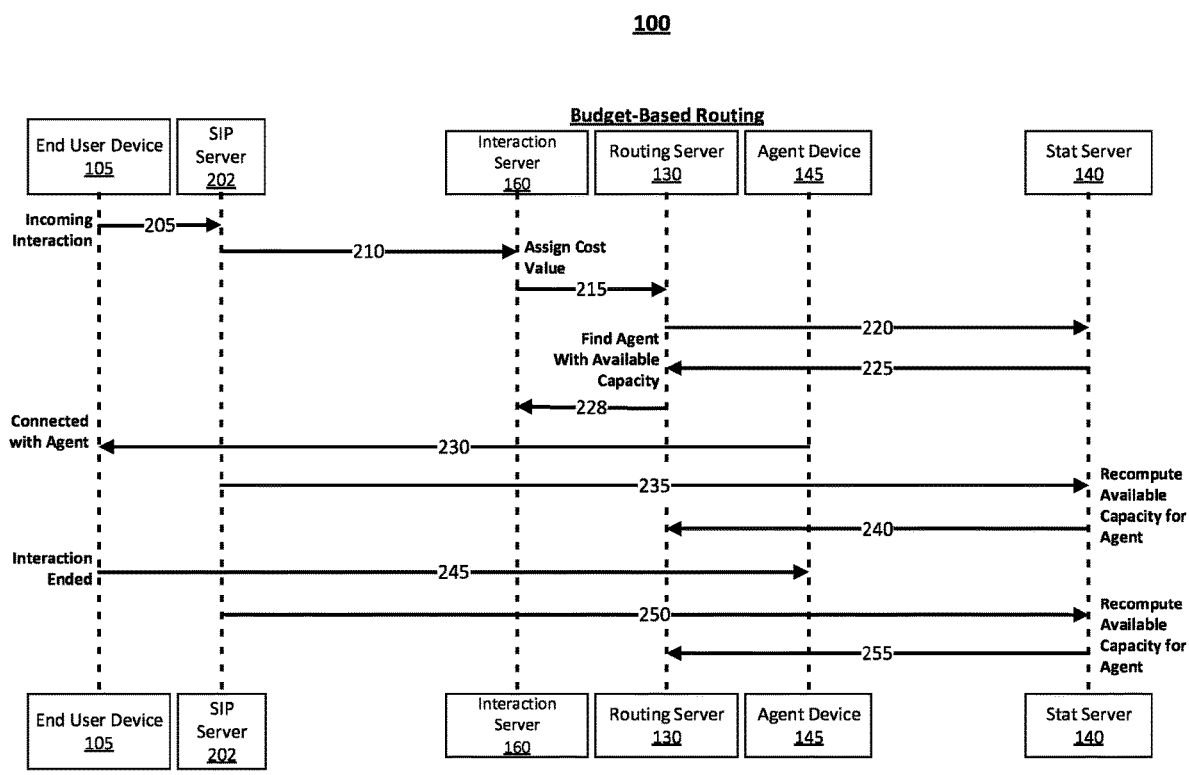
FIG. 2 illustrates a sequence diagram of a method in accordance with aspects of the present invention.

To further understand how budget-based routing transpires, FIG. 2 illustrates a sequence diagram of the message flow between contact center resources in relation to an exemplary interaction. Specifically, FIG. 2 shows that, in implementing aspects of the present invention, sequence of messages or data may be passed among the several contact center resources, including an SIP server 202 (which is part of the call controller server 120); an interaction server 160; a routing server 130; an agent device 145; and a stat server 140. As will be seen, though other configurations are also possible, the interaction server 160 may implement logic for assigning a cost value to an incoming interaction, such as pursuant to media type and difficulty classifications. In an example of operation, as shown in FIG. 2, the cost value may be passed to the routing server 130 and stat server 140 as user data within the interaction event. The routing server 130 may implement logic for routing the incoming interaction to an agent with a sufficient available capacity value. The stat server 140 may implement logic for recomputing available capacity values for agents as interactions are routed to them and as interactions end.

As shown, at step 205, an incoming interaction arrives at the SIP Server 202, thereby initiating the process.

At step 210, information about the incoming interaction is provided to the interaction server 160. Using this information, the interaction server 160 implements logic to assign a cost value to an incoming interaction. As described above, the cost value may reflect the media type and difficulty classification determined for the incoming interaction.

At step 215, the assigned cost value is passed to the routing server 130. The routing server 130 may query the stat server at step 220 for agents that could handle the incoming interaction given the cost value. In response to this, the stat server 140 may apply a capacity filter to the list of agents and, thereby, compose a list of agents that have sufficient available capacity for handling the interaction. Specifically, this would include all agents with enough available capacity so that the routing of the interaction to them would not exceed their capacity value, e.g., the adding of the cost value of the interaction to the current sum of cost values of other interactions being handle would not exceed that agent's capacity value. With this list, the stat server 140 may also provide the used capacity for each of those agents. For the cost logic it is sufficient that stat server 140 sends only the aggregate agent's value, without details on how this is composed of individual interaction costs. At step 225, the resulting list is then sent to the routing server 130.

Now having the cost value of the incoming interaction and the list of agents with sufficient capacity, the routing server 130 may implement logic for routing the incoming interaction to a particular agent. The logic may take into account both available capacity and used capacity levels for each of the agents. Logic may include the incoming interaction being routed to agent with the most available capacity or the least used capacity. Other rules may be implemented as part of the logic applied to route the interaction, such as experience level or special abilities of the agents. With the routing determined, at step 228, the routing server 130 instructs the interaction server 160 what agent to route the interaction to, and, at step 230, the agent device 145 and the end user device 105 are connected.

With this successful connection, at step 235, a message may be sent from the SIP server 202 to the stat server 140 confirming that the interaction is ongoing, i.e., that the interaction was successfully routed to the particular agent and/or the agent is currently communicating with the customer. With this instruction, the stat server 140 may recompute the available capacity and used capacity for that particular agent so that each now reflects that the agent is handling an additional interaction. At step 240, the stat server 140 may send the recomputed numbers for available and used capacity of the agent to the routing server 130, where those values may be used in routing other incoming interactions.

At step 245, the interaction may end, e.g., the agent or customer may terminate the communication and/or the agent has completed any necessary follow-up actions and indicated that the interaction has ended. Once this occurs, at step 250, a message may be sent from the SIP server 202 to the stat server 140 informing that the interaction has ended. This may prompt the stat server 140 to recompute the available capacity and used capacity for that particular agent so that each reflects that the interaction has ended. Then, at step 255, the stat server 140 may send the recomputed numbers for available and used capacity to the routing server 130, where those numbers may be used in routing other incoming interactions.

In alternative embodiments, the routing server 130 and/or stat server 140 may also consider admissible overload when routing incoming interactions. Further, in example embodiments, an agent may be able to modify the cost value of an ongoing interaction. For example, once the agent begins interacting with the customer, the agent may determine that what was first rated to be a low difficulty interaction is actually a high difficulty interaction or vice versa. Additionally, in certain instances, an interaction may change media. For example, a chat interaction often escalates into a voice interaction. When this occurs, the cost value may be automatically adjusted or adjusted at the request of the agent. In all cases, the stat server 140 may recalculate capacity accordingly. In other embodiments, an agent be given the ability to update their own capacity to reflect what they are actually capable of handling.

In accordance with the concepts discussed thus far, attention will now turn to describing a preferred embodiment. Specifically, the present invention may include a method for routing interactions arriving at a contact center among agents. The method may include the steps of: providing a cost schedule for the interactions, where the cost schedule includes a classifier in which categories of interaction types are defined and a cost value corresponding to each of the interaction types; providing a capacity value for each of the agents; and routing the interactions in accordance with a routing process. Described in relation to a first interaction, the routing process of the present invention may include: receiving the first interaction; pursuant to the classifier, classifying the first interaction as being a first interaction type; determining the cost value of the first interaction as being the cost value corresponding to the first interaction type in the cost schedule; calculating for each of the agents an available capacity; and routing the first interaction to a first agent based, at least in part, on the available capacity of the first agent being sufficient given the cost value of the first interaction. Alternatively, the routing process may include routing the first interaction to the first agent based, at least in part, on the first agent having an available capacity that exceeds the available capacity calculated for each of the other agents. In another embodiment, the routing process may include routing the first interaction to the first agent based, at least in part, on the first agent having a used capacity that is less than the used capacity calculated for each of the other agents.

In example embodiments, when defined in relation to an example using the first agent, the capacity value is a maximum permissible value for a total sum of the cost values of the interactions being handled concurrently by the first agent. The capacity value may be uniquely tailored to an agent in accordance with a corresponding agent capability rating. For example, the agent capability rating may include an experience level of the agent, a training course completed by the agent, or a recent performance characteristic of the agent related to handling particular types of the interactions. Further, the cost values of the cost schedule may be weighted to reflect relative differences between the interaction types in terms of an estimated percentage of an agent's attention span expended in the handling thereof.

In example embodiments, when described in relation to an example using the first agent, the step of calculating the available capacity for each of the agents may include: determining ongoing ones of the interactions (hereinafter "ongoing interactions") being handled concurrently by the first agent; classifying each of the ongoing interactions per the interaction types of the classifier; determining the respective cost values of the ongoing interactions as being the cost value corresponding to the interaction type of each in the cost schedule; determining a used capacity of the first agent by summing the cost values of the ongoing interactions; and calculating the available capacity of the first agent as a difference between the capacity value and the used capacity of the first agent.

In example embodiments, the first interaction classifier may be a media classifier. In such cases, the interaction types may be the different types of media over which interactions are conducted, for example, telephone, chat, email, text, video conferencing; and screen sharing. Alternatively, the first interaction classifier may be a difficulty classifier. In such cases, the interaction types of a difficulty classifier may include two or more categories that differentiate between less difficult interactions and more difficult interactions.

In example embodiments, the interaction type of an interaction may be adjusted or modified after the interaction has begun, which may then lead to the available capacity for the agent changing. For example, a communication may be received that recommends the interaction type of an ongoing interaction be modified. The ongoing interaction may then be reclassified per the recommendation, with the available capacity of the agent being recalculated as necessary so that it reflects the reclassification. There are several instances where this functionality may prove advantageous. First, in cases of the interaction classifier being a difficulty classifier, such functionality may allow an agent to change the difficulty rating of an ongoing interaction as more information becomes known about the true difficulty of the interaction. As will be appreciated, it may be that what was initially thought to be a difficult interaction proves to actually be a simple one, or vice versa. In such cases, the agent may send a communication recommending that the interaction type of the ongoing interaction be changed to more accurately reflect the level of difficulty. Second, in cases of the interaction classifier being a media classifier, reclassifying the interaction type may become necessary to reflect a change in media occurring while an interaction is ongoing. For example, often interactions that began over chat media escalate to a telephone interaction. In such cases, the change in media may be detected and an automated communication then sent that recommends reclassification to reflect the change.

Computer Systems

In example embodiments, each of the various servers, controls, switches, gateways, engines, and/or modules (collectively referred to as servers) in the described figures are implemented via hardware or firmware (e.g., ASIC) as will be appreciated by a person of skill in the art. Each of the various servers may be a process or thread, running on one or more processors, in one or more computing devices (e.g., FIGS. 4A, 4B), executing computer program instructions and interacting with other system components for performing the various functionalities described herein. The computer program instructions are stored in a memory which may be implemented in a computing device using a standard memory device, such as, for example, a RAM. The computer program instructions may also be stored in other non-transitory computer readable media such as, for example, a CD-ROM, a flash drive, etc. A person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JSON.

Figure 3A:
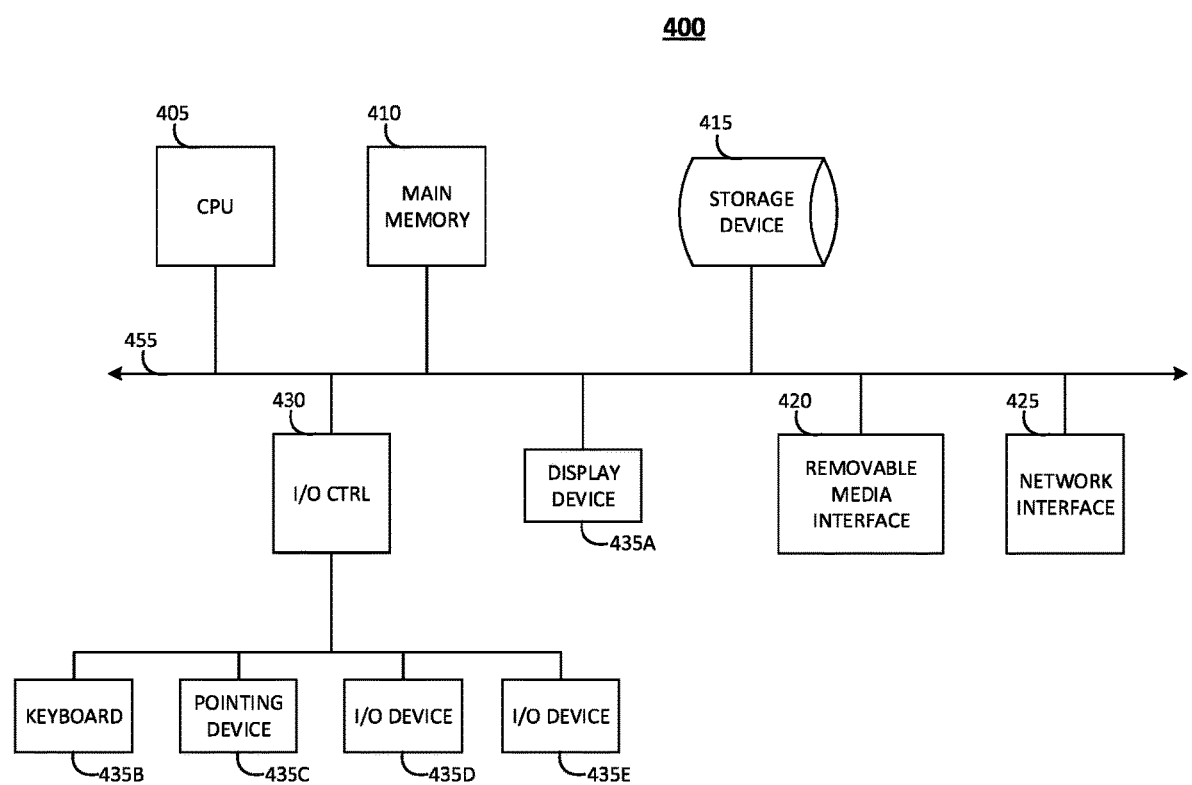
FIG. 3A illustrates an embodiment of a block diagram of a computing device in accordance with aspects of the present invention.
Figure 3B:
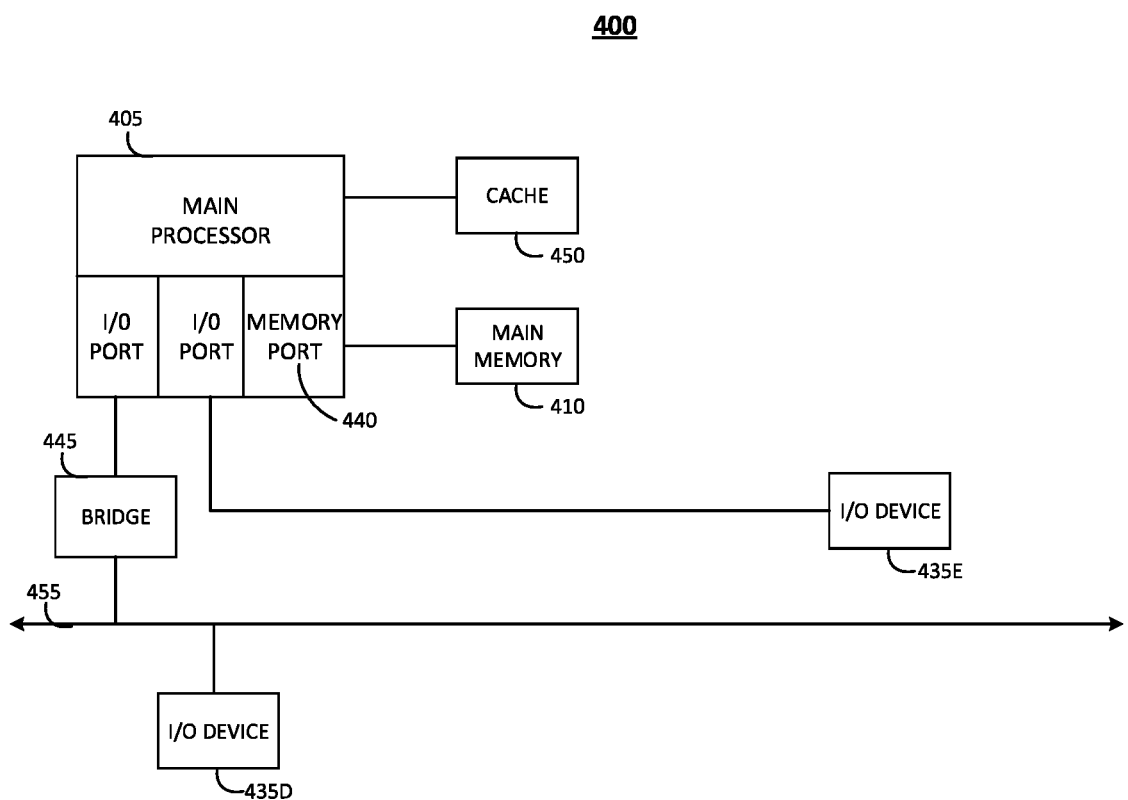
FIG. 3B illustrates an embodiment of a block diagram of a computing device in accordance with aspects of the present invention.

FIGS. 4A and 4B are diagrams illustrating an embodiment of a computing device as may be employed in an embodiment of the invention, indicated generally at 400. Each computing device 400 includes a CPU 405 and a main memory unit 410. As illustrated in FIG. 3A, the computing device 400 may also include a storage device 415, a removable media interface 420, a network interface 425, an input/output (I/O) controller 430, one or more display devices 435A, a keyboard 435B and a pointing device 435C (e.g., a mouse). The storage device 415 may include, without limitation, storage for an operating system and software. As shown in FIG. 3B, each computing device 400 may also include additional optional elements, such as a memory port 440, a bridge 445, one or more additional input/output devices 435D, 435E, and a cache memory 450 in communication with the CPU 405. The input/output devices 435A, 435B, 435C, 435D, and 435E may collectively be referred to herein as 435.

The CPU 405 is any logic circuitry that responds to and processes instructions fetched from the main memory unit 410. It may be implemented, for example, in an integrated circuit, in the form of a microprocessor, microcontroller, or graphics processing unit, or in a field-programmable gate array (FPGA) or application-specific integrated circuit (ASIC). The main memory unit 410 may be one or more memory chips capable of storing data and allowing any storage location to be directly accessed by the central processing unit 405. As shown in FIG. 3A, the central processing unit 405 communicates with the main memory 410 via a system bus 455. As shown in FIG. 3B, the central processing unit 405 may also communicate directly with the main memory 410 via a memory port 440.

In example embodiments, the CPU 405 may include a plurality of processors and may provide functionality for simultaneous execution of instructions or for simultaneous execution of one instruction on more than one piece of data. In example embodiments, the computing device 400 may include a parallel processor with one or more cores. In example embodiments, the computing device 400 includes a shared memory parallel device, with multiple processors and/or multiple processor cores, accessing all available memory as a single global address space. In another embodiment, the computing device 400 is a distributed memory parallel device with multiple processors each accessing local memory only. The computing device 400 may have both some memory which is shared and some which may only be accessed by particular processors or subsets of processors. The CPU 405 may include a multicore microprocessor, which combines two or more independent processors into a single package, e.g., into a single integrated circuit (IC). For example, the computing device 400 may include at least one CPU 405 and at least one graphics processing unit.

In example embodiments, a CPU 405 provides single instruction multiple data (SIMD) functionality, e.g., execution of a single instruction simultaneously on multiple pieces of data. In another embodiment, several processors in the CPU 405 may provide functionality for execution of multiple instructions simultaneously on multiple pieces of data (MIMD). The CPU 405 may also use any combination of SIMD and MIMD cores in a single device.

FIG. 3B depicts an embodiment in which the CPU 405 communicates directly with cache memory 450 via a secondary bus, sometimes referred to as a backside bus. In other embodiments, the CPU 405 communicates with the cache memory 450 using the system bus 455. The cache memory 450 typically has a faster response time than main memory 410. As illustrated in FIG. 3A, the CPU 405 communicates with various I/O devices 435 via the local system bus 455. Various buses may be used as the local system bus 455, including, but not limited to, a Video Electronics Standards Association (VESA) Local bus (VLB), an Industry Standard Architecture (ISA) bus, an Extended Industry Standard Architecture (EISA) bus, a Micro Channel Architecture (MCA) bus, a Peripheral Component Interconnect (PCI) bus, a PCI Extended (PCI-X) bus, a PCI-Express bus, or a NuBus. For embodiments in which an I/O device is a display device 435A, the CPU 405 may communicate with the display device 435A through an Advanced Graphics Port (AGP). FIG. 3B depicts an embodiment of a computer 400 in which the CPU 405 communicates directly with I/O device 435E. FIG. 3B also depicts an embodiment in which local buses and direct communication are mixed: the CPU 405 communicates with I/O device 435D using a local system bus 455 while communicating with I/O device 435E directly.

A wide variety of I/O devices 435 may be present in the computing device 400. Input devices include one or more keyboards 435B, mice, trackpads, trackballs, microphones, and drawing tables, to name a few non-limiting examples. Output devices include video display devices 435A, speakers and printers. An I/O controller 430 as shown in FIG. 3A, may control the one or more I/O devices, such as a keyboard 435B and a pointing device 435C (e.g., a mouse or optical pen), for example.

Referring again to FIG. 3A, the computing device 400 may support one or more removable media interfaces 420, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 435 may be a bridge between the system bus 455 and a removable media interface 420.

The removable media interface 420 may, for example, be used for installing software and programs. The computing device 400 may further include a storage device 415, such as one or more hard disk drives or hard disk drive arrays, for storing an operating system and other related software, and for storing application software programs. Optionally, a removable media interface 420 may also be used as the storage device. For example, the operating system and the software may be run from a bootable medium, for example, a bootable CD.

In example embodiments, the computing device 400 may include or be connected to multiple display devices 435A, which each may be of the same or different type and/or form. As such, any of the I/O devices 435 and/or the I/O controller 430 may include any type and/or form of suitable hardware, software, or combination of hardware and software to support, enable or provide for the connection to, and use of, multiple display devices 435A by the computing device 400. For example, the computing device 400 may include any type and/or form of video adapter, video card, driver, and/or library to interface, communicate, connect or otherwise use the display devices 435A. In example embodiments, a video adapter may include multiple connectors to interface to multiple display devices 435A. In another embodiment, the computing device 400 may include multiple video adapters, with each video adapter connected to one or more of the display devices 435A. In other embodiments, one or more of the display devices 435A may be provided by one or more other computing devices, connected, for example, to the computing device 400 via a network. These embodiments may include any type of software designed and constructed to use the display device of another computing device as a second display device 435A for the computing device 400. One of ordinary skill in the art will recognize and appreciate the various ways and embodiments that a computing device 400 may be configured to have multiple display devices 435A.

An embodiment of a computing device indicated generally in FIGS. 4A and 4B may operate under the control of an operating system, which controls scheduling of tasks and access to system resources. The computing device 400 may be running any operating system, any embedded operating system, any real-time operating system, any open source operation system, any proprietary operating system, any operating systems for mobile computing devices, or any other operating system capable of running on the computing device and performing the operations described herein.

The computing device 400 may be any workstation, desktop computer, laptop or notebook computer, server machine, handled computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 400 may have different processors, operating systems, and input devices consistent with the device.

In other embodiments, the computing device 400 is a mobile device. Examples might include a Java-enabled cellular telephone or personal digital assistant (PDA), a smart phone, a digital audio player, or a portable media player. In example embodiments, the computing device 400 includes a combination of devices, such as a mobile phone combined with a digital audio player or portable media player.

A computing device 400 may be one of a plurality of machines connected by a network, or it may include a plurality of machines so connected. A network environment may include one or more local machine(s), customer(s), customer node(s), customer machine(s), customer computer(s), customer device(s), endpoint(s), or endpoint node(s) in communication with one or more remote machines (which may also be generally referred to as server machines or remote machines) via one or more networks. In example embodiments, a local machine has the capacity to function as both a customer node seeking access to resources provided by a server machine and as a server machine providing access to hosted resources for other customers. The network may be LAN or WAN links, broadband connections, wireless connections, or a combination of any or all of the above. Connections may be established using a variety of communication protocols. In one embodiment, the computing device 400 communicates with other computing devices 400 via any type and/or form of gateway or tunneling protocol such as Secure Socket Layer (SSL) or Transport Layer Security (TLS). The network interface may include a built-in network adapter, such as a network interface card, suitable for interfacing the computing device to any type of network capable of communication and performing the operations described herein. An I/O device may be a bridge between the system bus and an external communication bus.

In example embodiments, a network environment may be a virtual network environment where the various components of the network are virtualized. For example, the various machines may be virtual machines implemented as a software-based computer running on a physical machine. The virtual machines may share the same operating system. In other embodiments, different operating system may be run on each virtual machine instance. In example embodiments, a "hypervisor" type of virtualizing is implemented where multiple virtual machines run on the same host physical machine, each acting as if it has its own dedicated box. The virtual machines may also run on different host physical machines.

Other types of virtualization are also contemplated, such as, for example, the network (e.g., via Software Defined Networking (SDN)). Functions, such as functions of session border controller and other types of functions, may also be virtualized, such as, for example, via Network Functions Virtualization (NFV).

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

That which is claimed:

1. A processor-implemented method for routing interactions arriving at a contact center among agents, the method comprising steps of:

providing a cost schedule for the interactions, wherein the cost schedule comprises:
    a classifier in which categories of interaction types are defined; and
    a cost value corresponding to each of the interaction types;
providing a capacity value for each of the agents;
routing the interactions in accordance with a routing process, wherein, described in relation to a first one of the interactions (hereinafter "first interaction"), the routing process comprises:
    (a) receiving the first interaction;
    (b) pursuant to the classifier, classifying the first interaction as being a first one of the interaction types (hereinafter "first interaction type");
    (c) determining the cost value of the first interaction as being the cost value corresponding to the first interaction type in the cost schedule;
    (d) calculating for each of the agents an available capacity; and
    (e) routing the first interaction to a first one of the agents (hereinafter "first agent") based, at least in part, on the available capacity of the first agent being sufficient given the cost value of the first interaction.

2. The processor-implemented method according to claim 1, wherein, defined in relation to an example using the first agent, the capacity value is a maximum permissible value for a total sum of the cost values of the interactions being handled concurrently by the first agent.

3. The processor-implemented method according to claim 2, wherein the cost values of the cost schedule are weighted to reflect relative differences between the interaction types in terms of an estimated percentage of an agent's attention span expended in the handling thereof.

4. The processor-implemented method according to claim 2, wherein, when described in relation to an example using the first agent, the step of calculating the available capacity for each of the agents comprises:
    determining ongoing ones of the interactions (hereinafter "ongoing interactions") being handled concurrently by the first agent;
    classifying each of the ongoing interactions per the interaction types of the classifier;
    determining the respective cost values of the ongoing interactions as being the cost value corresponding to the interaction type of each in the cost schedule;
    determining a used capacity of the first agent by summing the cost values of the ongoing interactions; and
    calculating the available capacity of the first agent as a difference between the capacity value and the used capacity of the first agent.

5. The processor-implemented method according to claim 4, wherein, described in relation to an example using the first agent, the step of calculating the available capacity further comprises:
    receiving a communication recommending that the interaction type of at least one of the ongoing interactions be modified;
    reclassifying the at least one of the ongoing interactions per the recommendation; and
    recalculating the available capacity given the reclassification.

6. The processor-implemented method according to claim 5, wherein first interaction classifier comprises a difficulty classifier, and wherein the interaction types of the difficulty classifier comprise at least two categories that differentiate between less difficult ones of the interactions and more difficult ones of the interactions; and wherein the communication comprises a communication sent from the agent recommending that the interaction type of the at least one of the ongoing interactions be modified to reflect a level of difficulty appreciated by the agent while handling the at least one of the ongoing interactions.

7. The processor-implemented method according to claim 5, wherein first interaction classifier comprises a media classifier, and wherein the interaction types comprise different types of media over which the interactions are conducted;

wherein the communication comprises an automated communication sent in response to detecting a change in the type of media over which the at least one of the ongoing interactions is being conducted.

8. The processor-implemented method according to claim 4, wherein the routing process further comprises:

routing the first interaction to the first agent based, at least in part, on the first agent having an available capacity that exceeds the available capacity calculated for each of the other agents.

9. The processor-implemented method according to claim 4, wherein the routing process further comprises:

routing the first interaction to the first agent based, at least in part, on the first agent having a used capacity that is less than the used capacity calculated for each of the other agents.

10. The processor-implemented method according to claim 4, wherein first interaction classifier comprises a media classifier, and wherein the interaction types comprise different types of media over which the interactions are conducted.

11. The processor-implemented method according to claim 10, wherein the different types of media include at least three of the following: telephone; chat; email; text; video conferencing; and screen sharing.

12. The processor-implemented method according to claim 4, wherein first interaction classifier comprises a difficulty classifier; and wherein the interaction types of the difficulty classifier comprise at least two categories that differentiate between less difficult ones of the interactions and more difficult ones of the interactions.

13. The processor-implemented method according to claim 4, wherein the capacity values are uniquely tailored to respective ones of the agents in accordance with an agent capability rating, the agent capability rating including at least one of:

an experience level of the agent;

a training course completed by the agent; and recent performance characteristics of the agent related to handling particular types of the interactions.

14. A system for routing interactions amount agents within a contact center, the system comprising:

a hardware processor; and a machine-readable storage medium on which is stored instructions that cause the hardware processor to execute a process, wherein the process comprises:

providing a cost schedule for the interactions, wherein the cost schedule comprises:

a classifier in which categories of interaction types are defined; and a cost value corresponding to each of the interaction types;

providing a capacity value for each of the agents;

routing the interactions in accordance with a routing subprocess, wherein, described in relation to a first one of the interactions (hereinafter "first interaction"), the routing subprocess comprises:

(a) receiving the first interaction;

(b) pursuant to the classifier, classifying the first interaction as being a first one of the interaction types (hereinafter "first interaction type");

(c) determining the cost value of the first interaction as being the cost value corresponding to the first interaction type in the cost schedule;

(d) calculating for each of the agents an available capacity; and (e) routing the first interaction to a first one of the agents (hereinafter "first agent") based, at least in part, on the available capacity of the first agent being sufficient given the cost value of the first interaction.

15. The system according to claim 14, wherein, defined in relation to an example using the first agent, the capacity value is a maximum permissible value for a total sum of the cost values of the interactions being handled concurrently by the first agent.

16. The system according to claim 15, wherein, when described in relation to an example using the first agent, the step of calculating the available capacity for each of the agents comprises:

determining ongoing ones of the interactions (hereinafter "ongoing interactions") being handled concurrently by the first agent;

classifying each of the ongoing interactions per the interaction types of the classifier;

determining the respective cost values of the ongoing interactions as being the cost value corresponding to the interaction type of each in the cost schedule;

determining a used capacity of the first agent by summing the cost values of the ongoing interactions; and calculating the available capacity of the first agent as a difference between the capacity value and the used capacity of the first agent.

17. The system according to claim 16, wherein the routing subprocess further comprises:

routing the first interaction to the first agent based, at least in part, on the first agent having an available capacity that exceeds the available capacity calculated for each of the other agents.

18. The system according to claim 16, wherein the routing subprocess further comprises:

routing the first interaction to the first agent based, at least in part, on the first agent having a used capacity that is less than the used capacity calculated for each of the other agents.

19. The system according to claim 16, wherein first interaction classifier comprises a media classifier, and wherein the interaction types comprise different types of media over which the interactions are conducted; and wherein the different types of media include at least three of the following: telephone; chat; email; text; video conferencing; and screen sharing.

20. The system according to claim 16, wherein first interaction classifier comprises a difficulty classifier; and wherein the interaction types of the difficulty classifier comprise at least two categories that differentiate between less difficult ones of the interactions and more difficult ones of the interactions.

* * * * *